United States Patent [19]

Watanabe et al.

[11] 3,793,708
[45] Feb. 26, 1974

[54] AUTOMATIC CUTTING-TIP REPLACING APPARATUS

[75] Inventors: Toshiaki Watanabe, Kasugai; Hideo Yuhara, Nagoya, both of Japan

[73] Assignee: Okuma Machinery Works Ltd., Kita-ku, Nagoya-shi, Japan

[22] Filed: Sept. 18, 1972

[21] Appl. No.: 289,894

[30] Foreign Application Priority Data
Sept. 20, 1971  Japan.............................. 46-73190

[52] U.S. Cl..................... 29/568, 29/26, 82/36 R
[51] Int. Cl............. B23q, B23b 39/00, B23b 29/00
[58] Field of Search ........... 82/36 R, 2; 29/568, 26

[56] References Cited
UNITED STATES PATENTS

| | | | |
|---|---|---|---|
| 3,443,310 | 5/1969 | Burroughs et al. | 29/568 |
| 3,460,412 | 8/1969 | Clausen et al. | 29/26 |
| 2,323,010 | 6/1943 | Couradson | 29/568 |
| 3,186,267 | 1/1965 | Pabst et al. | 82/2 |
| 3,513,734 | 5/1970 | Burroughs et al. | 82/36 |
| 3,186,085 | 1/1965 | Coate | 29/568 |
| 3,186,266 | 1/1965 | Coate | 29/26 |

*Primary Examiner*—Harrison L. Hinson
*Attorney, Agent, or Firm*—Ladas, Parry, Von Gehr, Goldsmith & Deschamps

[57] ABSTRACT

An automatic cutting-tip replacing apparatus in a machine tool, having means for firmly clamping, at the required position, a cutting-tip which is detachably attached to the predetermined position of a tool holder or a cutting tool shunk and for removing the cutting-tip therefrom, and also having means for feeding a spare tip to said required position, said apparatus being mounted on a rotary table rotating between the tip-replacing position and the awaiting position. This arrangement eliminates the prior need of replacing the entire tool holder and greatly reduces the size of the tool replacing device thereby making both the designing of the apparatus and the attachment of the apparatus to the machine easy, providing an efficient operation as well as greatly saving time and labor.

6 Claims, 13 Drawing Figures

FIG. 4
FIG. 5
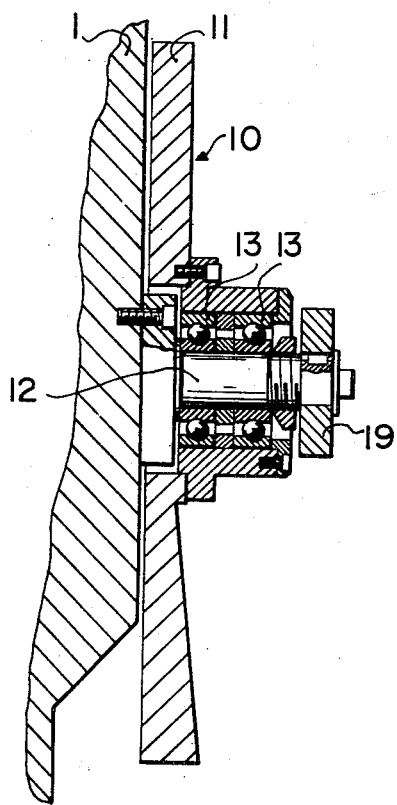
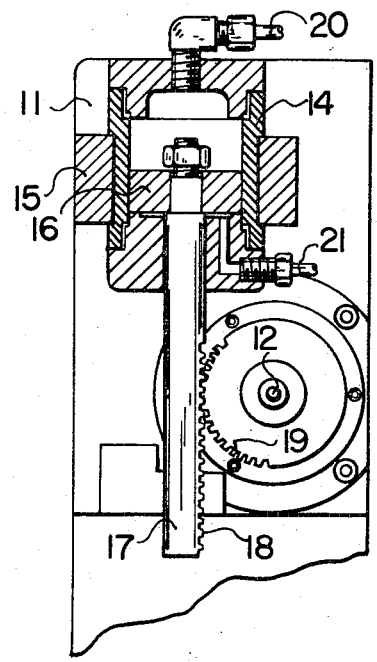

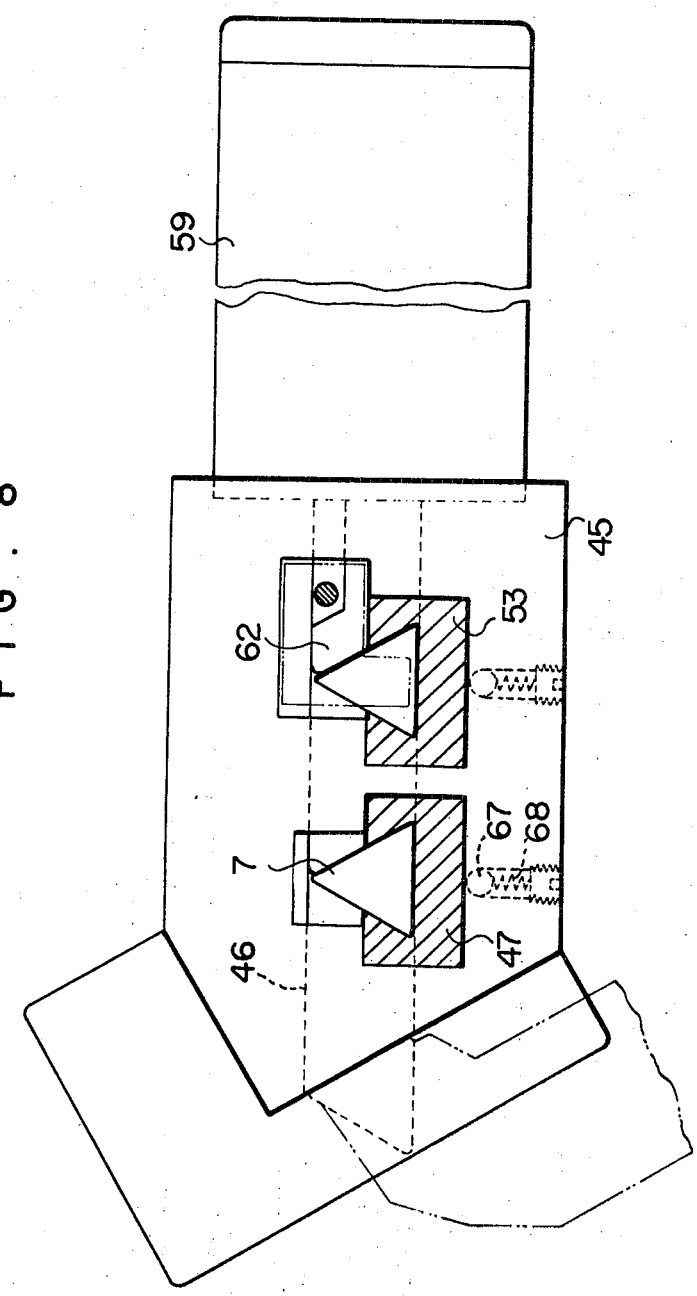

AUTOMATIC CUTTING-TIP REPLACING APPARATUS

BACKGROUND OF THE INVENTION

1. Field of the Invention

The present invention pertains to an apparatus for automatically replacing the cutting head of a machine tool, such as the cutting-tip of a clamping tool in a lathe.

2. Description of the Prior Art

In the field of numerically controlled machine tools, there are widely used automatic processing-tool replacing apparatuses. However, known such apparatuses have the drawbacks such that, when it is intended to replace a processing tool due to the wear, tipping or damage of the cutting blade (hereinafter to be called a cutting-tip) which is fixed to a tool, it has been necessary to replace the tool holder per se as a whole unit. This naturally led to the replacing apparatus to become large in size, and a large size apparatus, in turn, not only gave rise to a great difficulty and a tremendous amount of labor in designing the apparatus as well as in attachment of such an apparatus to the machine tool, but also consumed a great deal of time in replacement of cutting-tips, and required a large number of tool holders.

SUMMARY OF THE INVENTION

It is, therefore, an object of the present invention to provide an automatic cutting-tip replacing apparatus arranged to replace only the cutting-tip of a small size and weight and to eliminate the aforesaid drawbacks of the prior art.

Another object of the present invention is to provide an automatic cutting-tip replacing apparatus of the type described, which is compact in size and high in efficiency which is represented by the easiness in the designing of the apparatus and in the attachment of the apparatus to a machine tool.

Still another object of the present invention is to provide the apparatus of the type described, which attains the aforesaid objects by providing the apparatus having means for firmly clamping, at the required position, a cutting tip which is detachably attached to the predetermined position of a tool holder or a cutting tool shunk and for easily removing the cutting-tip from said position, and also means to bring a spare cutting-tip to said required position.

Yet another object of the present invention is to provide the apparatus of the type described above, which is mounted on a rotary table rotating between the tip-replacing position and the awaiting position.

A further object of the present invention is to provide an apparatus of the type described above, which has a container for containing spare cutting-tips and means for dispensing a fresh cutting-tip from said container.

A still further object of the present invention is to provide an apparatus of the type described above, which further has means for introducing used tips into a collector receptacle.

A yet further object of the present invention is to provide an apparatus of the type described above, wherein the container is locally cut out to allow the head of the cutting-tip to be discerned externally and wherein this container is detachably mounted on the apparatus.

Another object of the present invention is to provide an apparatus of the type described above, which has means to indicate the number of spare cutting-tips housed in the container.

Yet another object of the present invention is to provide an apparatus of the type described above, which has cassettes for receiving fresh cutting-tips and used cutting-tips, respectively, means for introducing fresh cutting-tips into said receiving cassette and for dispensing the cutting-tips one after another, means for removing the cutting-tip located at the tip attaching position of the tool holder and for feeding a spare cutting-tip to said position, and means for tightly fixing the cutting-tip at its attaching position and for removing same after its being used, said apparatus being arranged to be rotated to be set to the tip-replacing position and to the awaiting position sequentially.

BRIEF DESCRIPTION OF THE DRAWINGS

The drawings show some examples of the apparatus of the present invention, wherein:

FIG. 4 is a somewhat diagrammatic sectional view taken along the line IV — IV in FIG. 2.

FIG. 5 is a sectional view taken along the line V — V in FIG. 3 and shows the cylinder section intended for the rotation of the apparatus.

FIG. 8 is a somewhat diagrammatic sectional view taken along the line VIII — VIII in FIG. 7 and shows the tip-replacing section.

DETAILED DESCRIPTION OF THE PREFERRED EMBODIMENT

Figure 1:
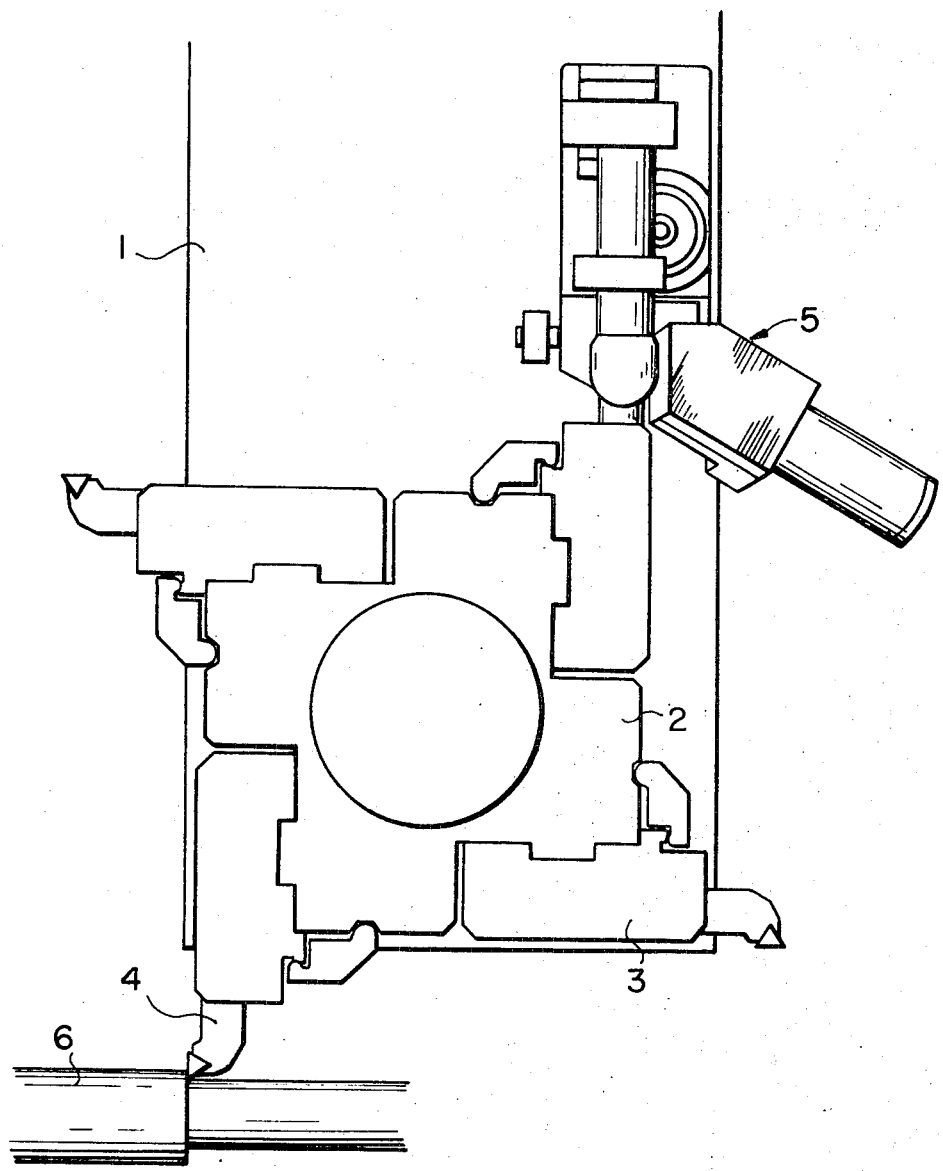
FIG. 1 is a somewhat diagrammatic illustration showing the relation between the apparatus and the tool post mounted on the carriage of the lathe.
Figure 2:
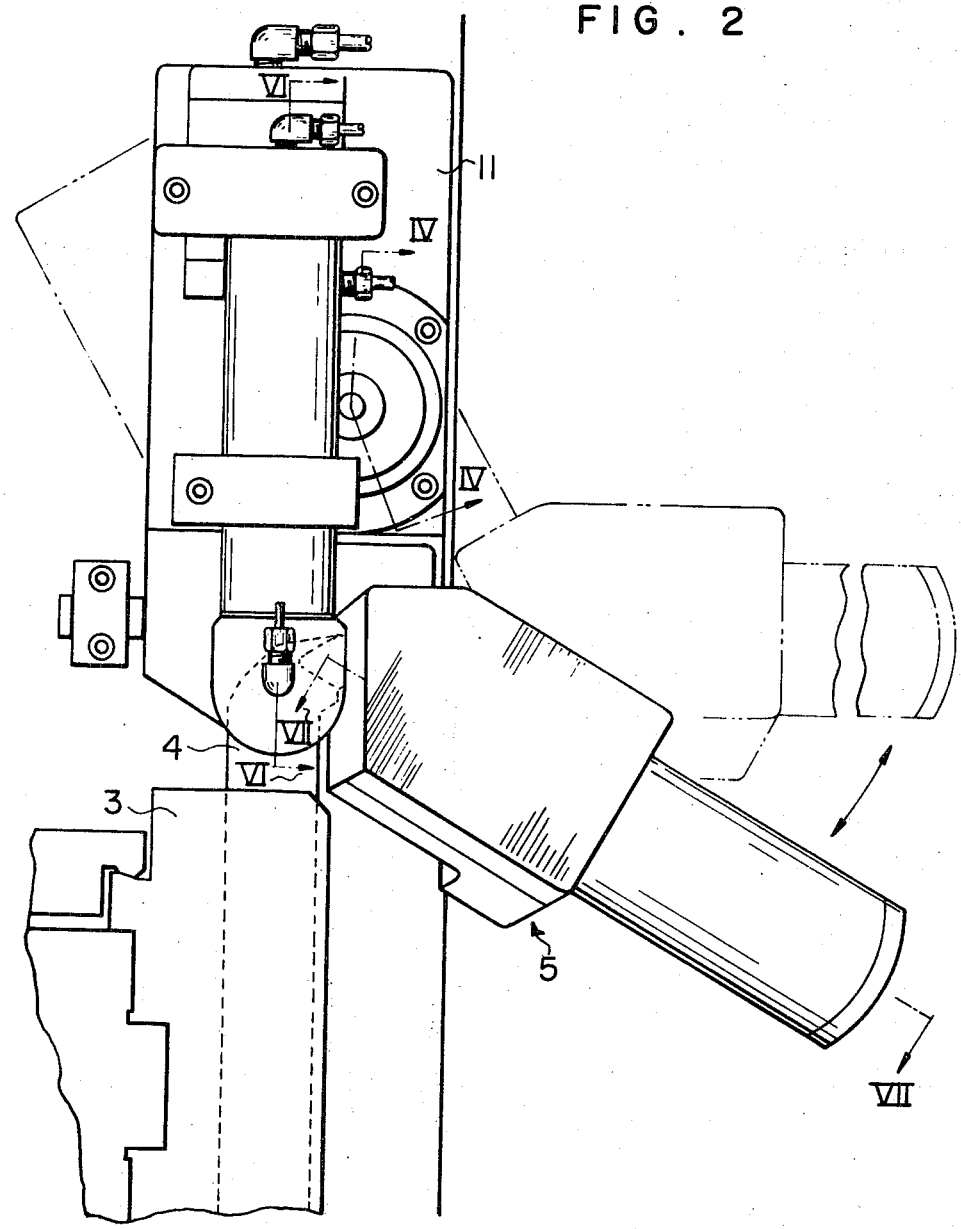
FIG. 2 is a somewhat diagrammatic front view of the apparatus.
Figure 3:
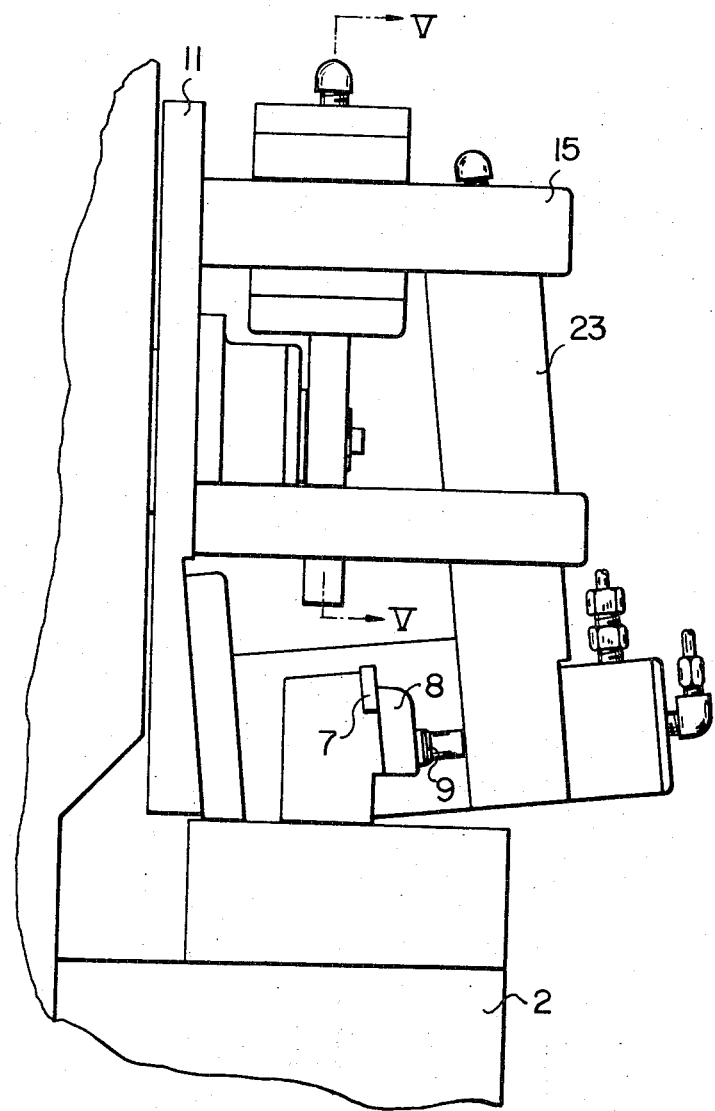
FIG. 3 is a somewhat diagrammatic left side view of same.
Figure 6:
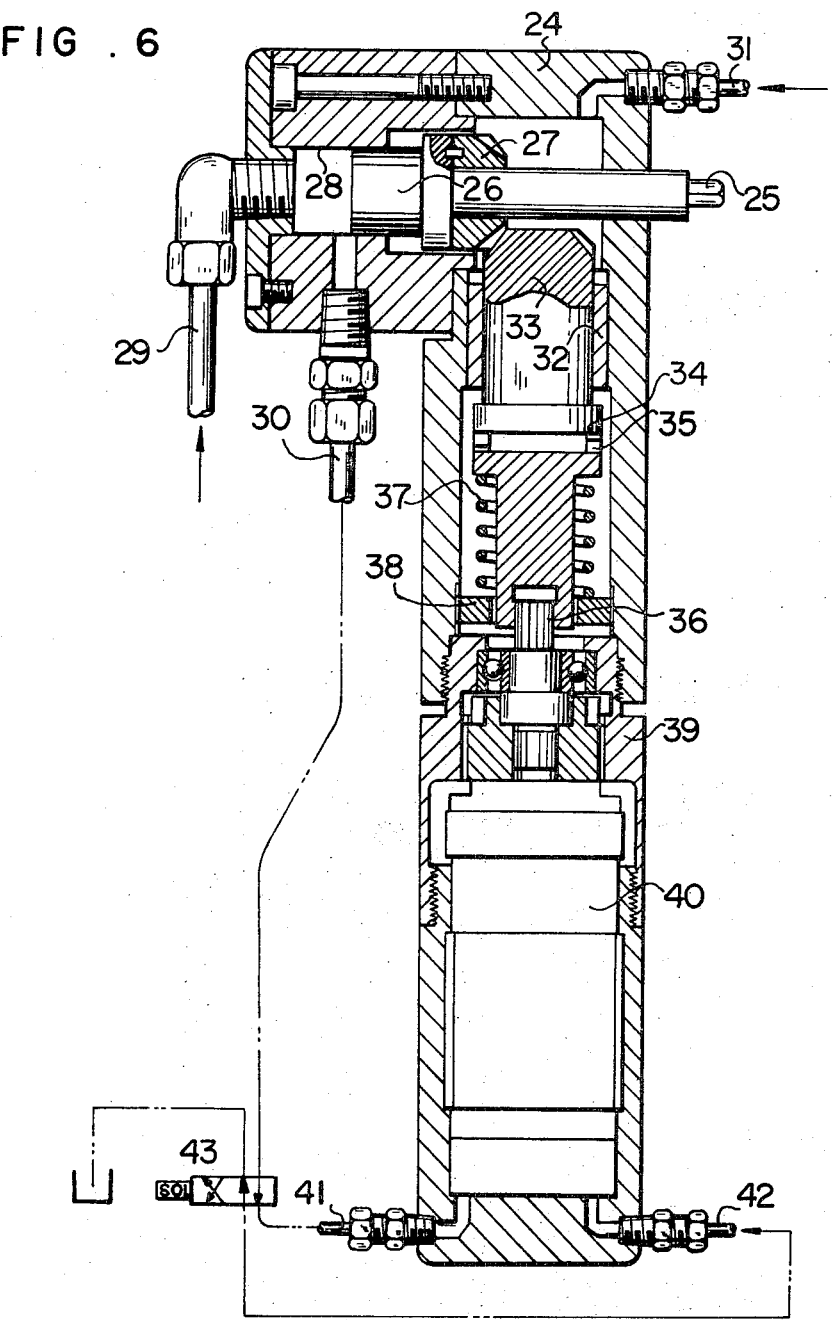
FIG. 6 is a sectional view taken along the line VI — VI in FIG. 2 and shows the driver section.

Description will hereunder be made on an example of the automatic cutting-tip replacing apparatus according to the present invention by referring to the drawings.

Reference numeral 1 represents a carriage of a lathe, on which is supported a turnable tool post 2 in such a way that this tool post 2 can be fixed at a required position. Numeral 3 represents a tool holder which can be quickly attached to the tool post 2 and can be replaced by a fresh one. This tool holder 3 has a clamping tool 4 tightly fastened thereto. There are provided awaiting tools and working tools. One of the awaiting tools is placed at the replacement position of the automatic cutting-tip replacing apparatus which will be described later. On the other hand, the working tool cuts a work 6 which is supported between the main stock and the tail stock barrel. The clamping tool 4 is arranged so that a cutting-tip 7 is received in the cutting-tip attaching position which has a recess formed on the upper surface of the foremost end of a tool shunk and that this clamping tool 4 is fastened tightly in place by a tip-clamping plate 8 which, in turn, is urged by a tip-clamping bolt 9. Numeral 11 represents a rotary base which is rotatably supported, by a bearing 13, on a supporting shaft 12 which, in turn, is secured to the carriage 1. Numeral 14 represents a cylinder which is locally braced by a bracket 15 secured to one surface of said rotary base 11. A piston 16 is received in this cylinder 14. Its piston rod 17 is provided with a rack 18 which meshes with a toothed wheel 19 secured on the supporting shaft 12. Thus by feeding a pressurized fluid to either the fluid line 20 or the fluid line 21 of the cylinder 14, said rotary base 11 is caused to rotate, in accordance with a command, about the toothed wheel 19 between the two positions, i.e., the cutting-tip replacing position and the awaiting position. Numeral 23 represents a driver locally braced by the bracket 15 on the rotary base 11 and is comprised of a driver section and a driving section. Numeral 25 represents a driver adapted to be received in the socket of the tip-clamping bolt 9. This driver 25 has a piston 26 formed at the farther end of this driver. A bevel gear 27 is secured to the base of this piston 26. This piston 26 is received in a cylinder 28 of a frame member 24. Fluid lines 29 and 30 are provided on this cylinder 28. Numeral 30 represents a fluid line which opens at an end into the side wall of the cylinder 28 and is arranged so that, immediately before the forward end of the driver 25 is received in the socket of the tip-clamping bolt 9 as the piston 26 is pushed towards said forward end of the driver 25 by the pressurized fluid supplied through the fluid line 29, the aforesaid open end of the fluid line 30 is rendered open progressively by the piston 26. Numeral 31 represents also a fluid line provided on the driver 25 side and is supplied therethrough with a pressurized fluid for pushing the piston 26 in the direction away from the forward end of the driver 25. It should be understood that, in place of the use of this pressurized fluid, the driver 26 may be normally urged by a spring in the direction that the driver 25 is brought outside of the socket of the bolt 9. Numeral 33 represents a bevel gear which is supported by a bearing 32 of the frame member 24 and meshes with the beveal gear 27. This bevel gear 33 has a dog clutch 34 on the side opposite to that side meshing with said bevel gear 27. Numeral 35 represents a claw clutch meshing with the aforesaid dog clutch 34. This claw clutch 35 is supported for free axial sliding movement. This clutch 35 is held in its state of meshing with the clutch 34 by a spring 37 which is adjusted of its amount of compression by an adjusting ring 38. Numeral 40 represents a fluid pressure-actuated motor which is housed within the frame member 24. The output shaft of this motor 40 is coupled to a speed reducing gear section 39. The output shaft of this speed reducing gear section 39 is in spline engagement 36 with the claw clutch 35. Numerals 41 and 42 represent fluid feed and drain lines to and from the fluid pressure actuated motor 40. Numeral 43 represents an electromagnetic changeover valve to perform the changeover of the fluid feed and drain lines 41 and 42 thereby causing the motor 40 to rotate forwardly and backwardly.

On the other hand, the automatic cutting-tip replacing section 5 which is fixed to the rotary base 11 is arranged as follows. A frame member 45 which is secured to the rotary base 11 has a cutting-tip passageway 46 formed horizontally therein substantially centrally thereof. This passageway 46 is arranged so that its open end faces and contacts the side of a used cutting-tip which is to be replaced, whenever the rotary base 11 is brought, by rotating, to the predetermined position for replacing the cutting-tip. Numeral 47 represents a cassette for receiving used cutting-tips. This cassette 047 is detachably received in a receiving slot which is formed at substantially right ngle relative to the cutting-tup passageway 46. A ball 67 which is normally urged by a spring 68 is held in a recess formed at the back of the cassette 47 to prevent causal detachment or loosening of this cassette from its position in the slot.

Figure 7:
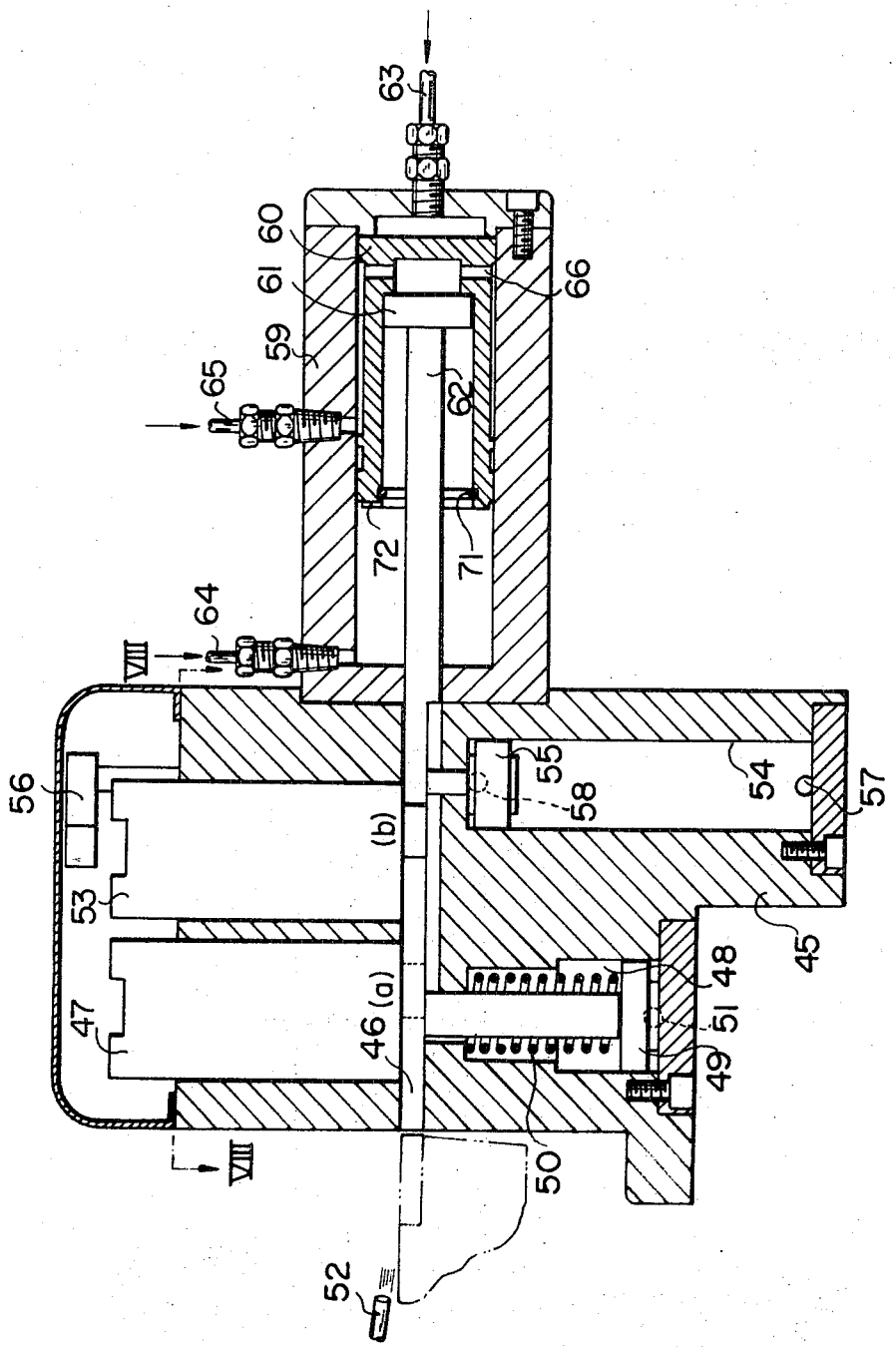
FIG. 7 is a somewhat diagrammatic sectional view taken along the line VII — VII in FIG. 2 and shows the tip-replacing section.
Figure 9A:
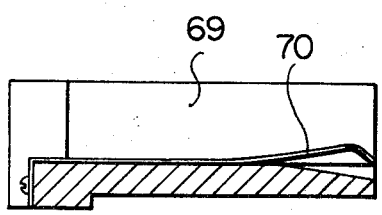
FIG. 9a is a somewhat diagrammatic illustration showing a cassette prior to being loaded with cutting-tips.
Figure 9B:
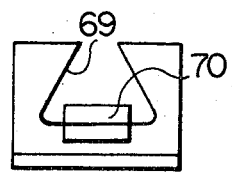
FIG. 9b is a somewhat diagrammatic illustration showing a right side view of the cassette prior to being loaded with cutting-tips.
Figure 9C:
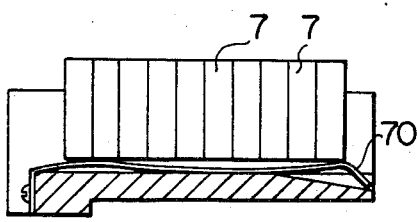
FIG. 9c is a somewhat diagrammatic longitudinal sectional view showing the cassette after being loaded with cutting-tips.
Figure 9D:
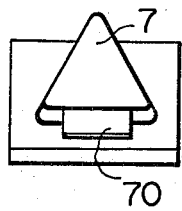
FIG. 9d is a somewhat diagrammatic right side view of the cassette after being loaded with cutting-tips.
Figure 10:
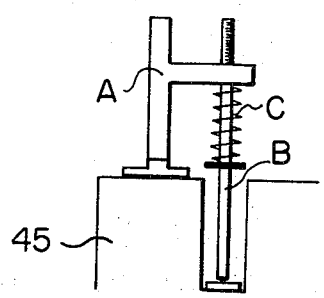
FIG. 10 is a somewhat diagrammatic illustration showing the indicating means.

This cassette has a groove for housing therein cutting-tips longitudinally thereof. For example, if the cutting-tip has a triangular shape, the cassette 47 has a dove-tail like groove 69 so that one of the apexes of this triangular shape can project beyond the opening of this groove of the cassette. A curved leaf spring 70 is fastened to the bottom surface of the groove so that two of the bottom faces of a plurality of cutting-tips contained in the cassette are urged upwardly to thereby be held firmly therein. That single apex of the cutting-tip which projects from the cassette is one that participates in the cutting operation. The operator is able to view the condition of the apex of the tool externally. Also, there is provided an indicating means for indicating the condition in which the cutting-tips are contained in the cassette, in the manner as shown in FIG. 10. More specifically a strut A is rotatably provided on a frame member 45 which is located close to the cassette. An indicator rod B bearing graduations representing the number of cutting-tips is inserted in the strut A in such a way that it is slidable in parallel with the groove 69 of the cassette and that this rod B is urged towards the upper face of the cutting-tip by a spring C, to thereby indicate the time for replacing the cassette. This indicating means is arranged that, when the cassette is to be replaced for a fresh one, this strut A is turned so that this struct A will not interfere with the replacing operation. Numeral 49 represents a piston which is received in a cylinder 48 provided at a position at which it faces said cassette 47 below the passageway 46 as viewed in FIG. 7. This piston 49 is normally urged downwardly in FIG. 7 by a spring 50. This piston 49 is caused to travel upwardly whenever a pressurized fluid is supplied through the fluid line 51 by command.

Numeral 52 represents a pipe for ejecting a pressurized fluid and is provided on the side opposite to the location of the cutting-up of the clamping tool. This pipe 52 is intended to blow into the passageway 46 the cutting-tip which has been loosened from its clamped state.

Numeral 53 represents a cassette which is provided perpendicularly to the passageway 46 and in parallel with the aforesaid cassette 47. This cassette 43 is constructed in the same fashion as that 47, and contains a plurality of spare cutting-tips. Numeral 55 represents a piston received in a cylinder 54 provided to face said cassette 53 via the passageway 46. The piston rod of this piston 55 extends up to that side of the slot for the insertion of the cassette 53, i.e., up to the side opposite to that opening of the slot facing the passageway 46. This piston rod has, secured to its foremost end, a block 56 for pushing out a cutting-tip contained in the cassette 53. Numerals 57 and 58 represent pressurized fluid lines provided on the cylinder 54. Numeral 59 represents a large cylinder secured to a lateral side of the frame member 45 in a direction perpendicular to said lateral side, said frame member 45 extending perpendicularly to the cutting-tip passageway 46. This large cylinder 59 receives therein a large piston 60. Said large cylinder 59 is of a dual cylinder structure such that said large piston 60 forms an inner smaller cylinder in which is received a smaller piston 61. Numeral 62 represents the piston rod of this smaller piston 61, which piston rod passes across the cutting-tip passageway 46. The foremost end of this piston rod 62 is of a shape corresponding to that of the cutting-tips so as to be suitable for positioning the cutting-tip. By the dual actions of said larger cylinder 59 and the smaller cylinder, there are provided the position (b) at which the used cutting-tip is received and the position (a) at which the fresh spare cutting-tip is received. Numerals 63 and 64 represent pressurized fluid lines for moving the larger piston 60. Numeral 65 represents the pressurized fluid line for actuating the smaller piston 61. This latter fluid line 65 communicates with the inside of the smaller cylinder via the fluid line 66 provided in this smaller cylinder through a recess formed in the outer circumferential wall of the larger piston 60.

The apparatus having the foregoing arrangement is operated in the following manner. When the cutting-tip replacement command is received after the wear or damage of the cutting-tip at work is sensed, the tool post 2 is turned until its tool holder 3 arrives at the cutting-tip replacing position. Whereupon, a pressurized fluid is supplied to the fluid line 20 of the cylinder 14 of the cutting-tip replacing apparatus 5 which till then has been in its awaiting position, so that this pressurized fluid pushes the piston 16. However, the rack 18 of the piston rod 17 is in the state of meshing with the toothed wheel 19 which, in turn, is key-locked to the supporting shaft secured to the carriage 1. Accordingly, the cylinder 14 is pushed and the rotary base 11 which is supported by the bearing 13 is rotated clockwise, thereby placing the cutting-tip replacing apparatus to the replacing position. When this positioning rotation completes, a pressurized fluid is fed to the fluid line 29 of the driver section. As a result, the piston 26 is pushed downwardly as viewed in the drawings, so that the driver 25 is brought into the socket of the clamping bolt 9. On the other hand, the fluid line 30 which opens through the wall of the cylinder 28 is opened in accordance with the movement of the piston 26. Therefore, the pressurized fluid is passed to the fluid line 41 of the fluid pressure-actuated motor 40 via the changeover valve 43 to rotate this motor 40. The revolutions of this motor 40 is transmitted to the claw clutch 35 via the speed reducing gear section 39 and the spline 36 of the output shaft. This clutch 35 is held in mesh with the dog clutch 34 of the bevel gear 33 by the spring 37. Thus, this bevel gear 33 rotates the bevel gear 27 which is secured to the driver 25. It is to be understood that the fluid line 30 is arranged so that it opens through the wall of the cylinder 28 at such an exact position at which this fluid line 20 is opened immediately before the driver 25 plunges into tthe socket of the cutting-tip clamping bolt 9. Therefore, the forward end of the driver 25 which has been turned by the motor 40 smoothly enters in the socket to loosen the cutting-tip clamping bolt 9. Upon completion of this loosening, a pressurized fluid is supplied to the fluid line 31 so that the piston 26 is pushed backwardly as viewed in the drawing, causing the driver 25 to be withdrawn from the socket. Along with this, the piston 26 closes the fluid line 30 to bring the motor 40 to a halt.

Thereafter, a pressurized fluid is ejected from the fluid ejecting pipe 52 to blow the used cutting-tip which has become loosened into the cutting-tip passageway 46 of the frame member 45. At such a time, the pressurized fluid from the fluid line 53 of the larger cylinder 59 has positioned the larger piston 60 at the extreme left side as viewed in the drawing, whereas it is to be understood that the smaller piston 61 is located at the extreme right side within the smaller cylinder. The forward end of the piston rod 62 brings the cutting-tip which has been blown into the passageway 46 at the position (b) to a halt in the foreground of the entrance of the cassette. Thereafter, a pressurized fluid is supplied to the fluid line 51 to push the piston 49 upwardly as viewed in the drawing against the force of the spring 50, so that the forward end of the piston rod pushes the cutting-tip which is then in the position (b) into the cassette 47. Whereupon, the indicator rod B which till then has been urged towards the groove 69 of the cassette 47 by the spring 70 is now pushed upwardly for a distance corresponding to a single cutting-tip to indicate the increased number of the cutting-tips contained in the cassette 47. Upon completion of this pushing-in of the cutting-tip into the cassette 47, the fluid running through the fluid line 51 is blocked, so that the piston 49 is brought backwardly by the elastic force of the spring 50. Subsequently, the connection of the fluid line of the cylinder 59 is changed, so that the fluid which till then has been supplied to the fluid line 63 is blocked and a pressurized fluid now begins to be supplied to the fluid line 64. As a consequence, the larger piston 60 which houses therein the smaller piston 61 is pushed to the right end, together with this smaller piston. As a result, the forward end of the piston rod 62 retreats to the position (a). Thereafter, the fluid line 57 of the cylinder 54 is opened so that a pressurized fluid is supplied to the fluid line 58, pulling the piston 55 downwardly as viewed in the drawing. As a consequence, the block 56 which is secured to the foremost end of the piston rod enters into the groove of the cassette 53 to push a single spare cutting-tip into the cutting-tip passageway 46. Thereafter the connection of the fluid line 58 is changed over to the fluid line 57, so that the piston 55 is pushed upwardly to its initial position as viewed in the drawing.

Then, by supplying a pressurized fluid through the fluid lines 63 and 65 of the larger cylinder 59, the larger piston 60 is moved to the left side, and along with this, the fluid coming through the fluid line 65 is supplied from the recess formed in the outer circumference of the larger piston 60 and via the fluid line 66 to the smaller cylinder contained in the larger piston 60. As a consequence, the smaller piston 61 is moved to the left side of the drawing, so that the spare cutting-tip which has been delivered to the position (a) is fed to the predetermined attachment position of the clamping tool 4.

Thereafter, the connection of the changeover valve 43 is changed. And, in the same manner as has been described, the air-driver 25 is pushed downwardly as the pressurized fluid is supplied to the fluid line 29. On the other hand, the pressurized fluid is supplied from the cylinder 28 and via the fluid line 30 and via the changeover valve 43 to the fluid line 42, thereby rotating the motor 40 in the direction opposite to that stated previously. As a consequence, the driver 25 will tighten the cutting-tip clamping bolt 9. When this tightening force gains a certain level of torque, the claw clutch 35 which meshes with the dog clutch 34 of the bevel gear 33 is pushed against the force of the spring 37, and accordingly, the meshing between these two clutches is released, and thus the rotating driver 25 is brought to a halt. As these two clutches part away from each other, the connection of the fluid line 29 is changed over to the fluid line 31, so that the pressurized fluid pushes the piston 26 backwardly.

Upon completion of the tight fastening of the cutting-tip, the connection of the fluid line 65 is switched over to the discharge mode, and now a pressurized fluid is supplied via the fluid line 64. At this stage, a pressurized fluid is being supplied also through the fluid line 63. The smaller piston 61 is thus caused to move towards the right end, and the forward end of its piston rod retreats to the position (b) at which the used cutting-tip is to be received thereby.

Subsequently, the connection of the fluid line 20 of the cylinder 14 is switched over to the discharge mode and a pressurized fluid is supplied via the fluid line 21. Whereupon, the cylinder 14 is pushed against the piston 16 which is in the fixed stage, so that the rotary base 11 is caused to turn counter-clockwise about the toothed wheel 19. As a consequence, the automatic cutting-tip replacing apparatus departs away from the cutting-tip replacing position, and thus the replacement of the cutting-tip completes. In this way, the tool post 2 is rendered rotatable, and a required tool is selected.

It is possible also — as the means for indicating the numbers of the fresh spare cutting-tips and of the used cutting-tips — to indicate, on a counter, such information as the number of actions exerted by the piston which is assigned to receive-in or push-out the cutting-tips.

Furthermore, it can be considered to arrange the cassette which is intended to collect therein used cutting-tips, in such a fashion that it can be rotated after a predetermined number of used cutting-tips have been accommodated therein. More specifically, if the cutting-tip has a triangular shape as illustrated, the cassette may be arranged to be rotated three times in three equal steps so as to expose a fresh cutting edge one after another sequentially. Moreover, the apparatus of the present invention may be adapted to the replacement of the cutting blade of a tool other than the tool of a lathe, without making many substantial modifications.

As stated above, according to the present invention, arrangement is provided so that only the cutting blade can be replaced by a fresh one without replacing the tool as a whole, and that fresh spare cutting blades are housed in a cassette and, used cutting blades are accommodated in another cassette, and alos that the cutting-tip replacing apparatus is able to assume the replacing position and the awaiting position, respectively. Thus, when compared with a known replacing apparatus which is designed to replace a tool as a whole having a substantially big weight and a large size, the replacing apparatus of the present invention is designed to replace only the cutting blade or tip which is small in weight and size. Therefore, this replacing apparatus per se can be made in a compact size, and its designing and attachment can be performed with ease. What is more, the means for storing the cutting blades can be provided, with no trouble, at a position close to the tool post. Not only those advantages described above, but also there are further advantages that this replacing apparatus does not need any auxiliary means for conveying the members which are to be replaced. Thus, this apparatus can have a very simplified structure, and accordingly the cost of its manufacture and the frequency of occurrence of disorders may be reduced greatly. In addition, the replacement section is small in size, and the replacing apparatus per se can be attached jointly with the tool post. As a result, there arises very little adverse effect due to reasons such as impact even when the replacement is effected during the awaiting period of the cutting blade or in the midst of the cutting operation, and also the length of time required for the replacement can be reduced to a great extent.

Furthermore, according to the present invention, arrangement is provided so that a plurality of cutting blades are accommodated in a cassette, so that stable replacement of cutting-tips can be made successively during a continuous operation of an extended period of time, and also that the replacement as well as the supply of fresh cutting-tips can be effected easily and quickly.

Also, arrangement is provided so that the number of the cutting-tips housed in the cassette is indicated to be discerned externally by the operator. This makes it possible that the timing of replacement of the cassette per se is kept from being delayed. Moreover, by feeding back the indicated value to a control means, it is possible to contribute more to the sound continuous operation.

In a machine tool designed to be operated by adaptive control system, the mode of processing operation will naturally require that the work be subjected to heavy cutting load. Therefore, the cutting blade will have to be replaced more frequently. However, when compared with the known apparatus designed so that a heavy tool holder as a whole is replaced, the present invention which is designed to replace only the used cutting-tip by a fresh one is far more advantageous over the prior art. According to the present invention, only the tool holder section can be modified so that there is the further advantage that it is not necessary to modify each of the numerous tool holders.

We claim:

1. An automatic cutting tip replacing apparatus comprising means for releasably clamping a cutting tip movably mounted in position on the tool holder or tool shank of a machine tool, means for removing a used tip from said mounting position, means for supplying a new tip to said mounting position, cassette means for respectively storing said used tips and new tips, all of said means being mounted as a unit on a rotary base movable between a waiting position and a cutting tip replacing position.

2. An automatic cutting-tip replacement apparatus according to claim 1, the means for releasably clamping and removing said cutting-tip is a piston-cylinder system utilizing a pressurized fluid.

3. An automatic cutting-tip replacing apparatus according to claim 1, the means for removing a used cutting-tip is a pipe for ejecting a pressurized fluid.

4. An automatic cutting-tip replacing apparatus according to claim 1, the means for removing a used cutting-tip is a pipe having a absorption force.

5. An automatic cutting tip replacing apparatus according to claim 1 in which said cassette means for used tips is locally cut out so that the cutting edge of a cutting tip is exposed from this cut out portion for visual inspection.

6. An automatic cutting tip replacing apparatus according to claim 5 further comprising means for indicating the number of used tips housed in said cassette means.

* * * * *